United States Patent
Linn (10) Patent No.: US 7,464,285 B2
(45) Date of Patent: Dec. 9, 2008

(54) CONTROLLING AN ACCUMULATION OF TIMING ERRORS IN A SYNCHRONOUS SYSTEM

(75) Inventor: Charles A. Linn, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 542 days.

(21) Appl. No.: 11/353,618

(22) Filed: Feb. 14, 2006

(65) Prior Publication Data

US 2007/0192649 A1 Aug. 16, 2007

(51) Int. Cl.
*G06F 1/04* (2006.01)

(52) U.S. Cl. .................. 713/503; 327/292; 375/371; 713/400

(58) Field of Classification Search .................. 327/292; 375/371; 713/400, 503
See application file for complete search history.

(56) References Cited

U.S. PATENT DOCUMENTS 4,896,338 A  1/1990  Rouillet et al.
6,121,816 A *  9/2000  Tonks et al. .................. 327/296

FOREIGN PATENT DOCUMENTS

| EP | 0 822 481 | 2/1998 |
|---|---|---|
| EP | 1 550 934 | 7/2005 |
| GB | 2 391 771 | 2/2004 |
| GB | 2 392 353 | 2/2004 |

\* cited by examiner

*Primary Examiner*—Thomas Lee
*Assistant Examiner*—Albert Wang
(74) *Attorney, Agent, or Firm*—Darby & Darby; Robert J. Sacco (57) ABSTRACT

Apparatus (100) for communicating clock correction data between two or more clocked entities (102, 104) using a standardized clock correction unit or quanta. A source-native pre-scaler (302) can convert source-native clock correction values to scaled source-native clock correction values. The pre-scaler can perform this conversion by multiplying each source-native clock correction value by a factor $N_1$. A source-native divider (308) can divide an adjusted source-native clock correction value by a value $M_1$ to produce a standard quotient and a standard remainder. The standard quotient defines a standard clock correction value. Further, a source-native accumulator 306 can accumulate a sum comprised of the scaled source-native clock corrections and the standard remainder produced from the source-native divider. The sum can define the adjusted source-native clock correction value.

15 Claims, 6 Drawing Sheets

CONTROLLING AN ACCUMULATION OF TIMING ERRORS IN A SYNCHRONOUS SYSTEM

BACKGROUND OF THE INVENTION

1. Statement of the Technical Field

The inventive arrangements relate to timing correction in synchronous data systems, and more particularly to preventing an accumulation of timing errors in such systems.

2. Description of the Related Art

Synchronous data systems transport data from end to end at a fixed rate with no flow control being employed. Once data has started to flow, exactly one bit of data is delivered for each clock transition. Once started, data must flow though all stages in the system without "running dry" or overrunning. Any system that handles synchronous data with arbitrarily long messages needs to address at least receive clock correction. Many other systems may have to provide transmit clock correction as well. Although implementation details differ somewhat, similar techniques are used to address both.

One technique for clock correction is sometimes referred to as the feed-forward technique. Systems utilizing this technique typically feed clock correction information forward from an upstream stage to downstream stages of the system. The downstream stage uses the clock correction information to make clock adjustments to a downstream clock. The feed-forward approach is conceptually simple. In practice, however, it takes considerable care to realize a working, reliable system in this way. Several factors must be considered in crafting a good implementation. For example, in synchronous systems using this technique, there is generally no feedback process to "undo" errors. Consequently, the feed-forward adjustments must be applied without any rounding or other errors that could accumulate over time. This is often challenging because the downstream clock period may not be an exact multiple or sub-multiple of the upstream clock correction value.

Still, the feed-forward approach shows promise for use in connection with synchronous communication systems implemented in software based radios. For the purposes of clock correction, the feed-forward technique merely needs to communicate time differences or deltas compared to a shared time reference. If such time differences can be communicated in some standardized units (e.g., microseconds), then waveform and platform portability can be achieved. Realizing these goals, however requires both proper platform design and proper attention to the software APIs concerned with clock correction.

Although a common clock can be shared between upstream and downstream processes (which are often executing on different processors), the "units" of correction typically must be customized for each process. For a given process, this correction "quantum" can be related to the common clock by some rational number N/M, where this fraction could be greater than, or less than 1. In this regard, the time correction values can be expressed in terms of a "natural quanta" that is well suited to the particular platform and waveform. Still, in certain types of systems, a standard, non-platform specific quantum of time is needed to communicate the correction requests from one platform to another. For example, in software-defined radios the waveform is architecturally separated from the platform. As a result, it can be desirable to utilize a standardized unit of time (e.g. a multiple of 1 microsecond) for communicating clock correction information between the various waveform and platform components employed in realizing a communications system. Such a standardized communication format is important for maintaining waveform portability. Significantly, however, if there are any rounding or truncation errors when translating between the process "natural quanta" and the standardized units, they can result in serious error accumulation problems. Accordingly, if such a standardized communication format is to be used, the conversion of clock correction information to the standardized rate must occur (at least on average) without any rounding or truncation errors.

SUMMARY OF THE INVENTION

The invention concerns a method for communicating clock correction data between two or more clocked entities using a standardized clock correction unit. The invention is particularly useful where the local clock rate for a first clocked entity and a second clocked entity are each derived from a common source. Pre and post conversion steps ensure that rounding and truncation errors are avoided.

The invention can include an apparatus for communicating clock correction data between two or more clocked entities using a standardized clock correction unit or quanta. In order to accomplish this result, a source clock correction translation functional block can be provided in the entity or process that is the source of the clock correction data. Similarly, a consumer clock correction translation functional block can be provided in the entity or process that is the consumer of such clock correction data.

The source clock correction translation functional block can include a source-native prescaler, a source native-divider, a source-native accumulator, and a source native divider. The source-native pre-scaler can convert source-native clock correction values to scaled source-native clock correction values. The source-native pre-scaler can perform this conversion by multiplying each source-native clock correction value by a multiplying factor. A source-native divider can be provided for dividing an adjusted source-native clock correction value by a value to produce a standard quotient and a standard remainder, the standard quotient defining a standard clock correction value. Further, a source-native accumulator can be provided for accumulating a sum comprised of at least one of the scaled source-native clock corrections and the standard remainder produced from the source-native divider. The sum can define the adjusted source-native clock correction value. Finally, the apparatus can also include a communication link for communicating each standard clock correction value from a first clocked entity to a second clocked entity.

The invention can also include a consumer-native pre-scaler, a consumer-native accumulator, and a consumer-native divider. The consumer-native pre-scaler can be used for converting the standard clock correction values to scaled standard clock correction values. In order to perform this function, the pre-scaler can multiply each standard clock correction value by a multiplying factor. A consumer-native divider divides an adjusted standard clock correction value by a value to produce a consumer quotient and a consumer remainder, the consumer quotient defining a consumer-native clock correction value. A standard accumulator can also be provided for accumulating a sum comprised of at least one of the scaled standard clock correction values and the consumer remainder produced from the consumer-native divider. The sum thus accumulated can define the adjusted standard clock correction value.

According to one aspect of the invention, the first and the second clocked entities can be components of a synchronous data transmission system. For example, the first and the second clocked entity can be selected from the group consisting of a synchronous data terminal, a data communications portion of a synchronous data communication radio, or a modem portion of a synchronous data communication radio.

The foregoing system may be more fully understood by recognizing that, in an actual synchronous data transmission system, there will be a sequence or stream of adjustments (in native quanta) that need to be communicated. The upstream portion of the data transmission system will continuously make clock adjustments. In the present invention, these clock adjustments are translated or converted and sent downstream to an entity that is a clock correction consumer. If the native adjustment is not enough to result in at least one consumer native adjustment quanta, then the adjustment will simply be accumulated until the value is large enough to result in at least one consumer native adjustment quanta. Further, it should be appreciated that native adjustments can be in either direction—positive or negative. Later negative values can subtract from accumulated positive values. Finally, it should be understood that for purposes of efficiency, the consumer translation process may occur at a much lower rate as compared to the more routine adjustments that are conventionally performed in a modem.

The invention can also concern a method for communicating clock correction data between two or more clocked entities using a standardized clock correction unit or quanta. The method can begin by converting source-native clock correction values to scaled source-native clock correction values. This step can be accomplished by multiplying each source-native clock correction value by a multiplying factor. Further, the method can include the step of dividing an adjusted source-native clock correction value by a value to produce a standard quotient and a standard remainder. The standard quotient can define a standard clock correction value. Finally, the method can include accumulating a sum comprised of at least one of the scaled source-native clock corrections and the standard remainder produced from the source-native divider. The sum can define the adjusted source-native clock correction value. Each the standard clock correction value can be communicated from the first clocked entity to the second clocked entity.

The method can also include the step of converting the standard clock correction values to scaled standard clock correction values. This step can include multiplying each standard clock correction value by a multiplying factor. The method can also include the step of dividing an adjusted standard clock correction value by a value to produce a consumer quotient and a consumer remainder. The consumer quotient in that case can define a consumer-native clock correction value. A sum can be accumulated that is comprised of at least one of the scaled standard clock correction values and the consumer remainder produced from the consumer-native divider. This sum can define the adjusted standard clock correction value.

The invention can also concern a machine readable storage, having stored thereon a computer program having two or more code sections executable by a machine for causing the machine to perform a number of steps. These steps can include converting source-native clock correction values to scaled source-native clock correction values by multiplying each source-native clock correction value by a factor. Further, the steps can also include dividing an adjusted source-native clock correction value by a value to produce a standard quotient and a standard remainder. The standard quotient can define a standard clock correction value. Finally, the steps can include accumulating a sum comprised of at least one of the scaled source-native clock corrections and the standard remainder produced from the source-native divider. The sum can define the adjusted source-native clock correction value. Each the standard clock correction value can be communicated from the first clocked entity to the second clocked entity.

DETAILED DESCRIPTION OF THE PREFERRED EMBODIMENTS

The invention concerns a method and apparatus for feed forward clock correction data. Clock correction data is communicated as between two or more clocked entities using a standardized clock correction time unit. The invention is particularly useful where the local clock rate for a first clocked entity and a second clocked entity are each derived from a common source. Pre and post conversion steps ensure that rounding and truncation errors are avoided. The invention is particularly useful for software-defined radio systems in both the transmit clock and receive clock correction scenarios.

Figure 1:
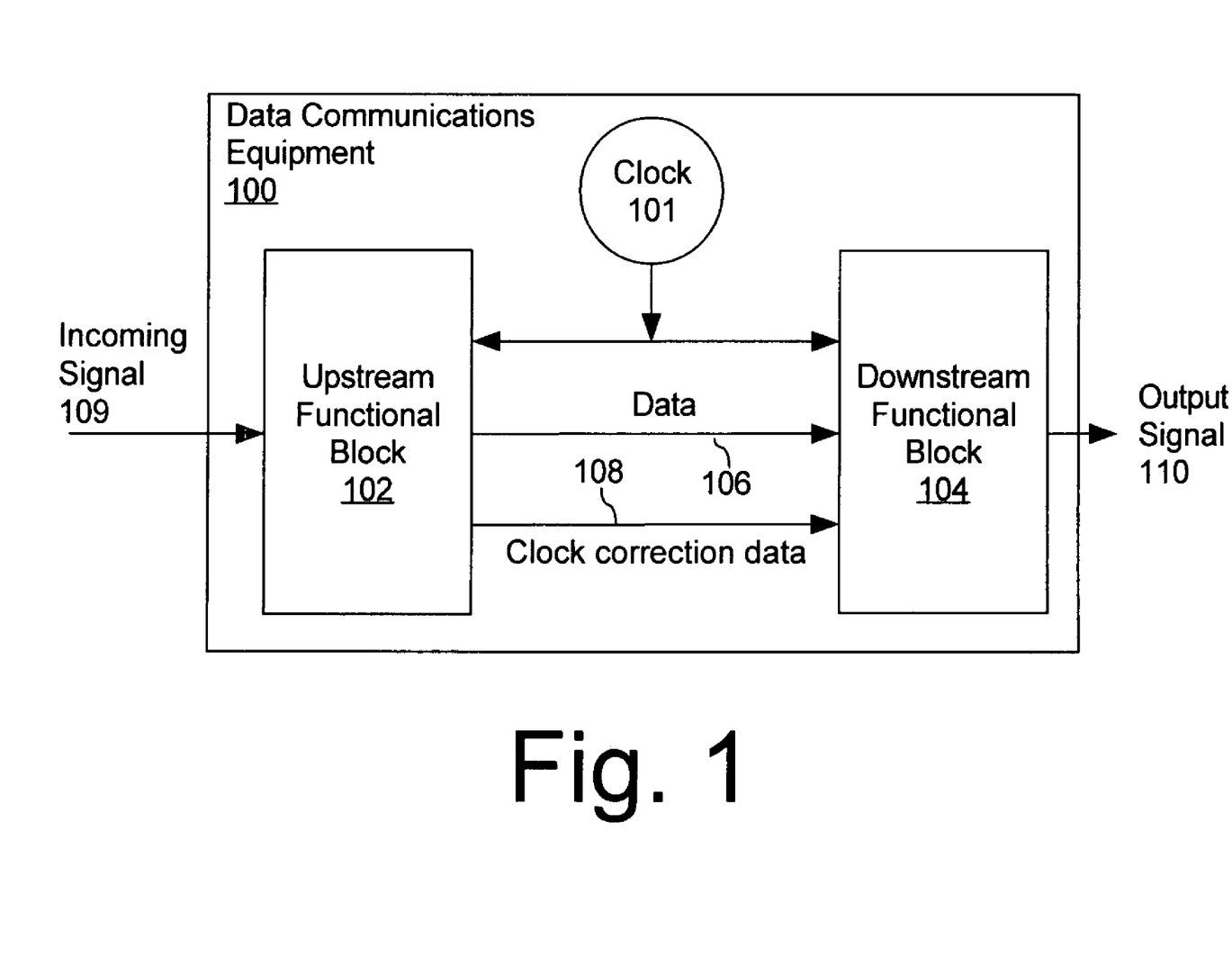
FIG. 1 is a conceptual block diagram showing functional blocks of synchronous communication equipment functions that are useful for understanding the invention.

FIG. 1 is a conceptual block diagram showing functional blocks of a synchronous communication system that uses feed forward clock correction. In FIG. 1, data communications equipment 100 can include two or more functional blocks. For example, these functional blocks can include an upstream functional block 102 and a downstream functional block 104. Traffic or payload data 106 can be communicated from the upstream functional clock 102 to the downstream functional block 104. For example, in a transmit scenario, the upstream functional block 102 can be an interface to a piece of external data communication equipment (DCE) and the downstream functional block 104 could be a modem translating the data to radio frequency modulation. In a receive scenario, the upstream functional block 102 could be a modem associated with a piece of radio equipment, and the downstream functional block 104 could include the DCE interface function to an external data terminal associated with the radio equipment. In either scenario, the downstream functional block 104 outputs data at a rate that is generally foreign to the local clock associated with that device. The data is usually passed out of the equipment by way of an over-the-air signal (transmit scenario) or through a data terminal equipment (DTE) interface (receive scenario).

In FIG. 1, the upstream functional block 102 provides data to the downstream functional block 104. The upstream functional block 102 can also measure the difference in arrival rate of data associated with incoming signal 109 relative to some local clock associated with the upstream functional block 102. This rate difference is communicated to the downstream functional block 104 as clock correction data 108. The downstream functional block 104 applies the clock correction data to its own local clock such that, on average, data leaves the downstream functional block 104 at exactly the rate that it entered the data communication equipment 100. Note that the downstream functional block 104 outputs traffic data as output signal 110 at a clock rate that is not necessarily the same as the local clock associated with the downstream functional block 104. Put another way, the corrections 108 cause adjustments to the local clock in block 104 that are derived from clock 101, resulting in a "corrected" rate. Further, the details of the clocking in the upstream and downstream functional blocks 102, 104 are typically not the same. However, the upstream and downstream functional blocks 102, 104 measure the passage of time at exactly the same rate. This common rate is typically established by means of a common clock 101, possibly employing phase locked loops, clock multipliers, clock dividers, and/or other functional mechanisms in the upstream and downstream functional blocks to synchronize the local clocks internal to upstream and downstream functional blocks 102, 104 with common clock 101. Common clock 101 can be located in the upstream functional block, the downstream functional block, or can be provided from a central or remote source.

Figure 2:
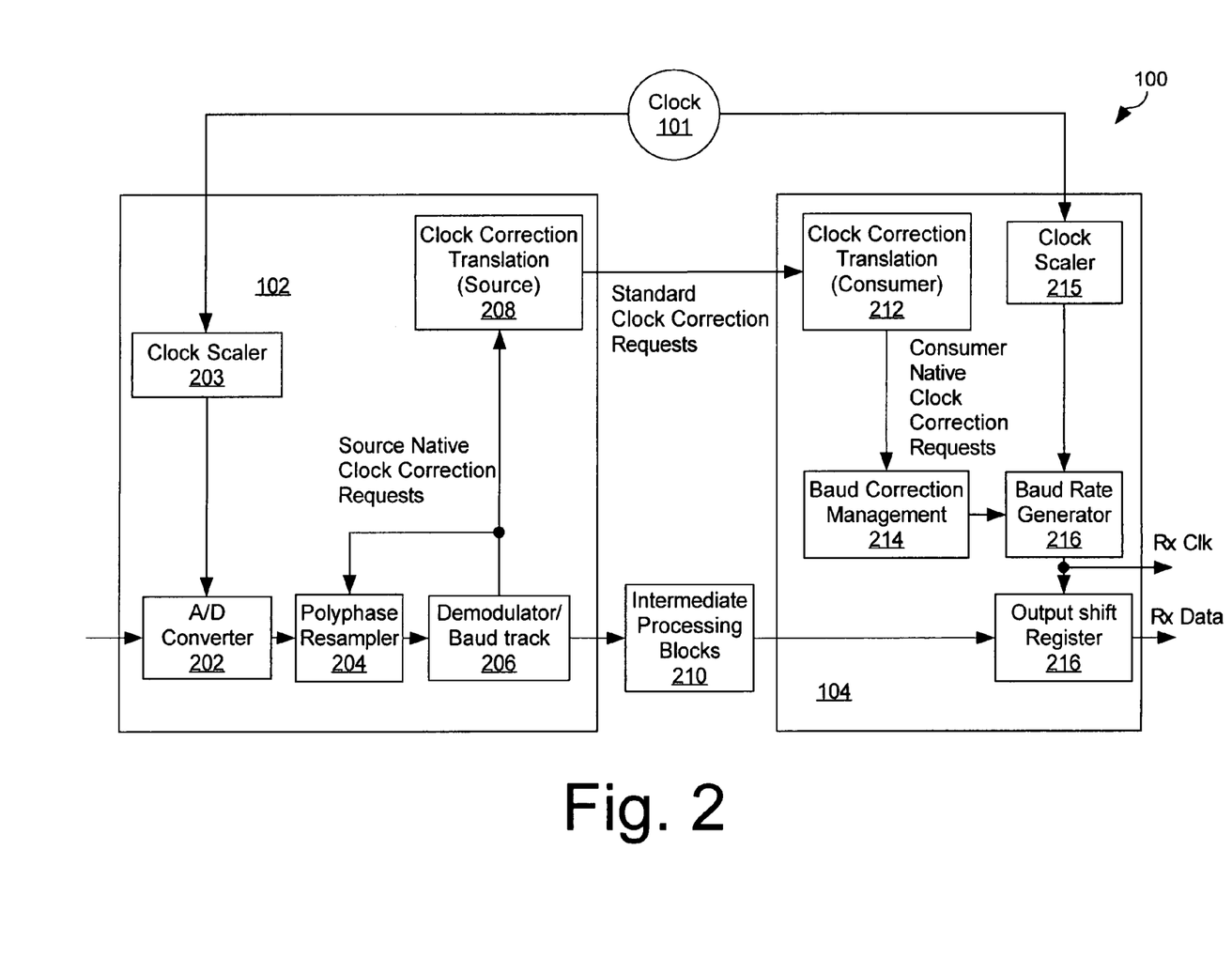
FIG. 2 is a more detailed view of the block diagram in FIG. 1.

The conceptual block diagram of FIG. 1 is illustrated in greater detail in FIG. 2 for the receive scenario described above. Accordingly, upstream functional block 102 could be a modem associated with a piece of radio equipment, and the downstream functional block 104 could include the DTE interface functions associated with the radio equipment. However, the invention is not limited in this regard. Instead, the block diagram in FIG. 2 is merely intended to illustrate one possibility of how the various features of the invention can be incorporated into synchronous communication equipment.

Referring now to FIG. 2, it can be observed that radio signals received by the upstream functional block 102 can be provided to an analog to digital (A/D) converter 202. The signals are sampled in the A/D converter 202 at a fixed sample rate based on the local clock in upstream functional block 102. The local clock can be directly or indirectly synchronized to clock 101, and will be related to the rate of common clock 101 by some rational scaling factor, $K_1/L_1$, where K and L are integers. For example, the local clock rate can be an integer multiple of the clock rate established by clock 101. The clock rate generated by clock 101 can be multiplied by some rational number in a clock scaler 203. Alternatively, or in addition thereto, the upstream functional block 102 can include a phase-locked-loop circuit that locks the output frequency of the local clock (not shown) to the frequency of the clock 101.

In the scenario illustrated in FIG. 2, the analog signal being sampled by A/D converter 202 carries data that is communicated from a remote location at the clock rate of the remote equipment (not shown). Consequently, the modulation symbol timing associated with the RF analog signal received by upstream functional block 102 can be expected to vary somewhat relative to the scaled clock rate output from clock scaler 203. Therefore, the resultant sample stream is often placed through a re-sampler, such as polyphase re-sampler 204, for optimal demodulation by demodulator/baud tracking block 206. The polyphase re-sampler re-samples the incoming data so that symbol (baud) boundaries can be exactly aligned with the sample boundaries. The required adjustment is detected using a baud tracking function in the demodulator/baud tracking block 206. Notably, the foregoing adjustment is representative of the amount of time "slippage" of the remote clock (not shown) relative clock 101. It also corresponds to the rate that data is being received relative to the local radio clock.

Data from the demodulator/baud tracking block 210 can be communicated to one or more intermediate processing blocks 210 before arriving at downstream functional block 104. The data can ultimately be communicated to an output shift register 216 where it can be clocked out of the downstream functional block 104 by a clock associated with baud rate generator 216. In FIG. 2, some rational scaling of clock 101 can be used to provide a timing signal associated with baud rate generator 216. For example, the signal from clock 101 can be rate adjusted by clock scaler block 215. A baud correction management block 214 is typically provided for responding to clock correction requests received from the upstream functional block 102. This baud rate generator usually accepts correction requests in some natural quanta related to the output baud rate.

Those skilled in the art will appreciate that the goal of receive clock correction in synchronous data communications equipment 100 is to clock out the data from the downstream functional block 104 at the same average rate that the data is received by the upstream functional block 102. In a feed-forward clock correction system, the measured "clock slippage" at the upstream functional block 102 is used to make corresponding adjustments to the baud rate generator 216 in the downstream functional block 104. Thus, in the receive scenario described herein, the modem represented by the upstream functional block 102 would communicate clock correction adjustments to the DTE interface, represented by the downstream functional block 104. Notably, the same clock correction data sent to the polyphase re-sampler 204 is typically also provided to the downstream functional block 104. Theoretically if the exact same adjustments are made to both, the Rx Clock signal output from the downstream functional block 104 should track the remote radio exactly.

In practice, it takes considerable care to realize a working, reliable system in this way. Several factors must be considered in crafting a good implementation. Notably since there is no feedback process, the feed forward adjustments must be applied without any rounding or other errors that could accumulate over time. This is often challenging because the clock period of the downstream functional block 104 may not be an exact multiple of the adjustments generated in the upstream functional block (e.g., sent to the polyphase re-sampler). In the case where the synchronous data communication equipment 100 is comprised of a software defined radio (SDR), a standardized correction unit (e.g. 1 microsecond) is advantageously used to communicate clock correction information between system blocks utilizing different local clock rates. A standardized "correction unit is advantageous since in a generalized SDR platform the actual clock rates used on a platform will not necessarily be known in advance, while at the same time it is desirable to standardize the clock correction requests in a platform-independent value.

As an example, in communication equipment 100 the period of clock 101 could be 1 microsecond (1 MHz rate) but the polyphase re-sampler 204 units could be in 3.33333333 ns (300 MHz) increments. Alternatively, the common clock 101 could have a rate of several hundred MHz, with the A/D converter 202 running at a great sub-multiple of this rate. A similar situation can exist in the downstream functional block 104, where the natural quanta are typically some sub-multiple of the baud rate. For portability, a standard, non-platform specific unit is needed to communicate the correction requests.

Referring again to FIG. 2, it can be observed that standard clock correction requests can be communicated between the upstream functional block 102 and the downstream functional block 104. As used herein, standard clock correction request refers to clock correction data that is expressed in some standardized quantum of time that is not platform specific. For example, the quantum of time can be expressed in increments of 10 ns, 100 ns, 500 ns, or 1 μs. Still, the invention is not limited in this regard, and any suitable predetermined quanta of time can be used to express clock correction values. Notwithstanding the desirability of utilizing a standard, non-platform specific unit to communicate the clock correction requests, it must be ensured that there are no rounding or truncation errors that occur when translating between the waveform or platform native clock correction requests and standard clock correction request.

In order to appreciate the problem associated with rounding and truncation, an example can be useful. For the purpose of this example, the standardized clock corrections in communication equipment 100 will be defined such that they are expressed in terms of a standardized quantum of time which is equal to 1 μs. Thus, the standardized clock correction values will always be expressed as an integer number of microseconds. Conversely, assume that the native clock correction requests sent to the polyphase re-sampler 204 in the upstream functional block 102 are expressed as a multiple of a time increment or quanta equal to 1/768 k seconds, based on data rate of 768 kbs. Any conversion of from the natural quanta of the native clock correction value to the natural quanta of the standardized clock correction value will typically result in a remainder or partial truncation of the correction value.

For example, the accumulated native clock correction request sent to the polyphase re-sampler 204 could be 5/768 k seconds. Translated to increments of microseconds, this value would be 6510.416667 μs. Since the standard clock correction request is expressed only in increments of 1 μs, the remainder amount (0.416667) would need to either be rounded or truncated when communicated from the upstream functional block 102, to the downstream functional block 104. Such rounding or truncation can ultimately result in an accumulation of timing errors that can lead to a data overflow or underflow in the downstream functional block 104.

The foregoing problem is addressed in the present invention by means of clock correction translation blocks 208, 212. These translation blocks are described in further detail in FIGS. 3 and 4. The various processing steps associated with the apparatus in FIGS. 3 and 4 can be better understood with reference to the flowcharts that are illustrated FIGS. 5 and 6.

It be understood from the more detailed disclosure below that the clock correction translation blocks can include a rational N/M rate converter. The clock correction translation blocks can also include an accumulator. In clock correction blocks 208, 212, the residual remainder from any N/M rate conversion is not discarded. Instead, the residual remainder is summed to the accumulator so as to adjust "raw" clock corrections values. The foregoing system is especially useful for software-defined radios because the resulting standard clock correction data is platform independent.

Figure 3:
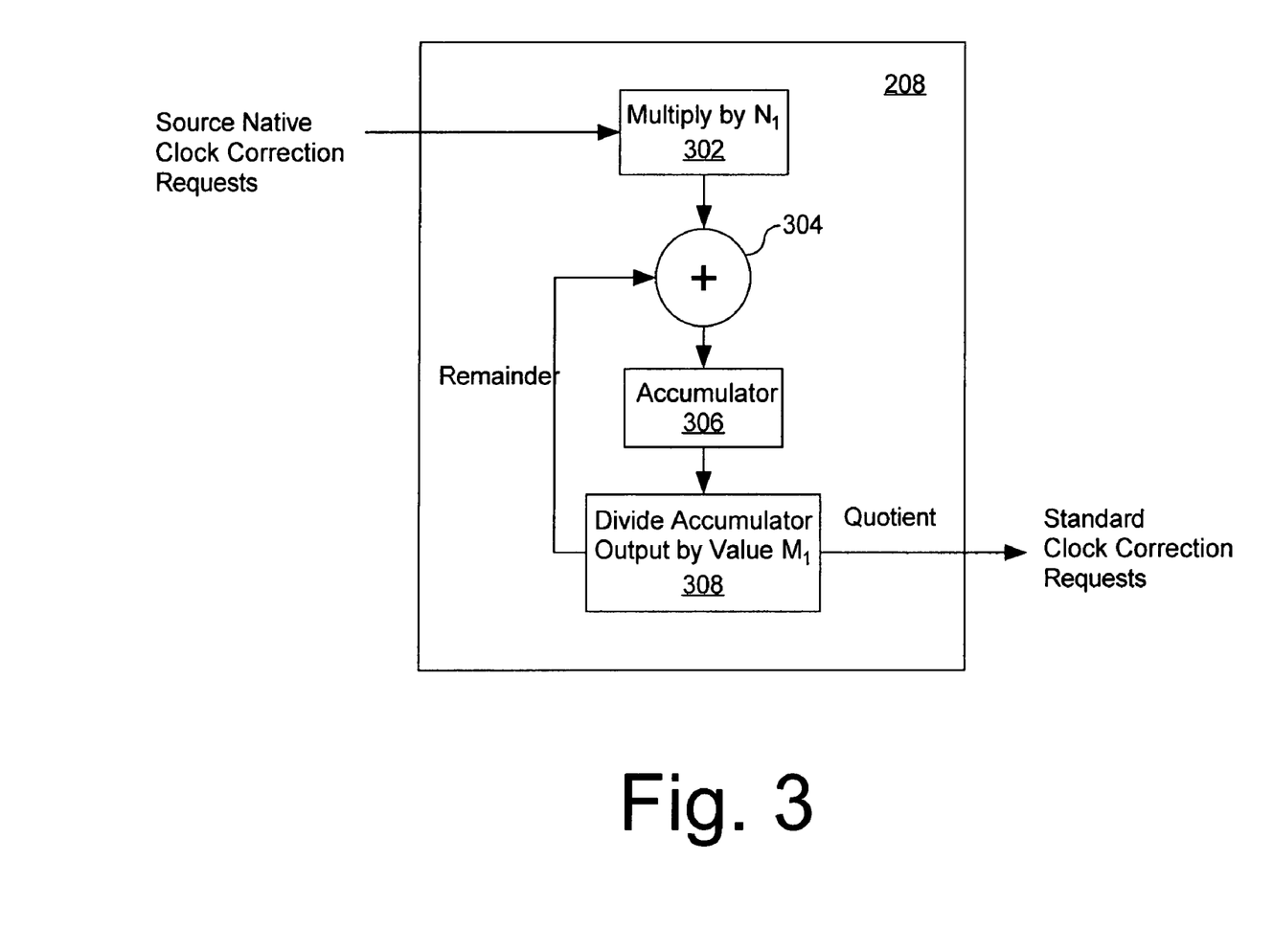
FIG. 3 is detailed block diagram showing the features of a first clock translation block in FIG. 2.

Referring now to FIG. 3, there is shown a block diagram that is useful for converting source-native clock correction value to standard clock correction values, without truncation and/or rounding errors. As used herein, the term source-native clock correction values refers to clock corrections that are expressed in terms of natural quanta associated with the upstream functional block 102. Natural quanta means a quanta or time increment that is an integer sub-multiple of the source-native clock correction request value.

Figure 5:
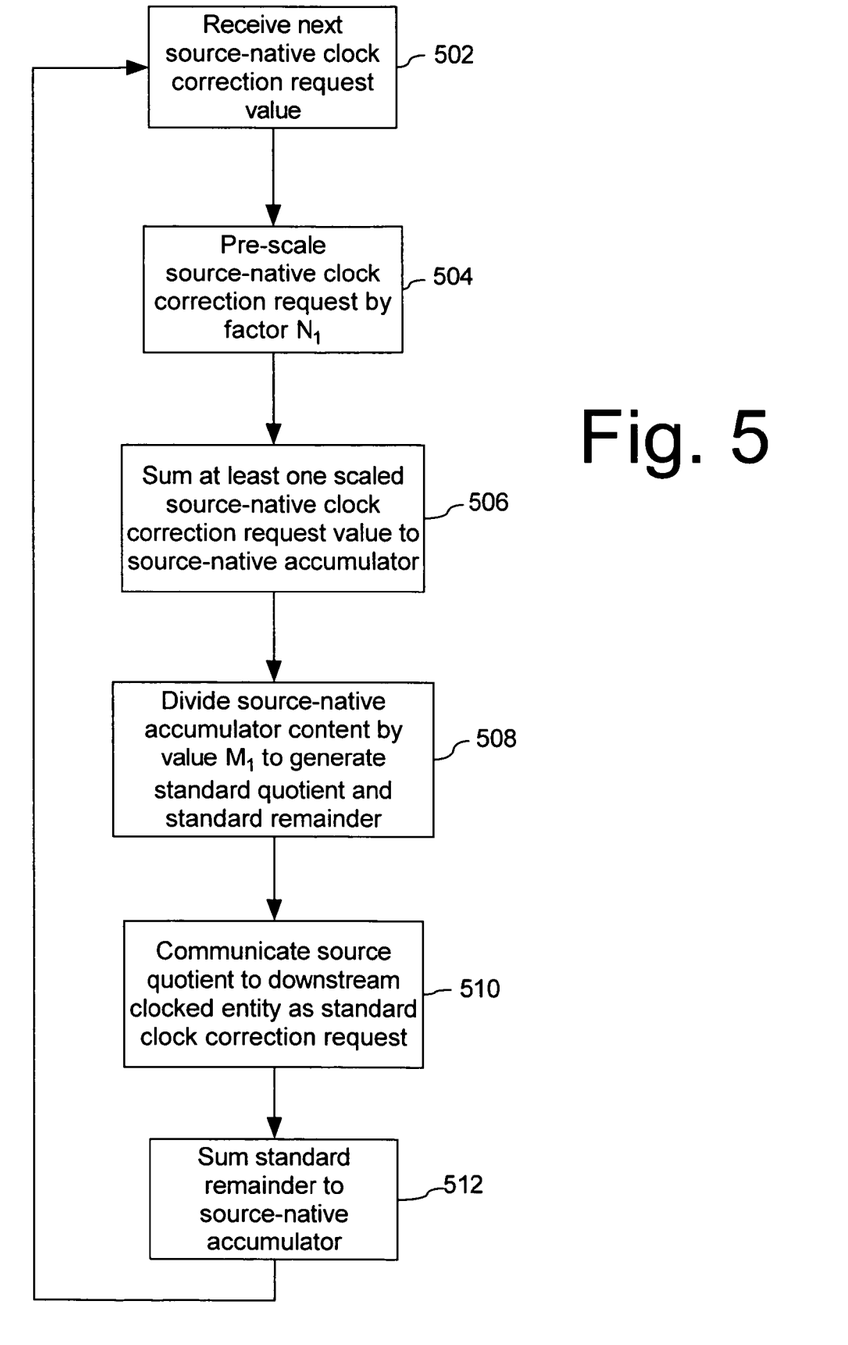
FIG. 5 is a flowchart that is useful for understanding the invention.

Referring now to FIGS. 3 and 5, source-native clock correction requests are received in step 502 in the clock correction translation block 208. Once received, these raw source-native clock correction requests are scaled up in step 504 by a multiplication factor of $N_1$. This step can be performed in multiplication block 302. It will be appreciated by those skilled in the art that when a correction value is scaled up in numerical value by some multiplication factor in step 504, there is a corresponding reduction in the quantity of time per correction unit. For example, if an incoming quanta of 1/768K units is multiplied by 125, there will be a higher unit number of corrections. However, each unit will represent a smaller amount of time, i.e. $1/(96\times10^6)$ of a second.

Following step 504, the scaled source-native clock correction request can be summed in step 506 to the accumulator 306. As will be described in further detail below, a remainder resulting from a division process performed on a preceding clock correction request can also be summed to the accumulator. The sum is stored in the source-native accumulator 306 as an adjusted source-native clock correction request.

In step 508, the adjusted source-native clock correction is passed to functional block 308 where it is divided by value $M_1$, thereby completing the $N_1/M_1$ rate conversion to generate a standard clock correction value. This standard clock correction value is comprised of a standard quotient and a standard remainder. In step 510, the standard quotient is communicated to the clock correction translation (consumer) block 212 as a standard clock correction request. In step 512, the standard remainder is summed with the next incoming source-native clock correction request, to generate the next adjusted source-native clock correction. As shown in FIG. 3, a communication link can be provided for communicating each standard clock correction request (quotient) from the upstream functional block 102 to the downstream functional block 104.

It should be understood that the rate of communicating each standard clock correction request (quotient) from the upstream functional block 102 to the downstream functional block 104 is not necessarily the same as the rate that the source native correction requests are being generated. For example, in a modem, corrections may be sent to a polyphase resampler at a 76K rate. However, the standard correction requests may optionally be sent downstream only when the aggregate correction is at least equal to some predetermined value, e.g. 100 μs. Optionally, the quotient and remainder values could be calculated at a KHz rate. In both cases, two parallel asynchronous processes could occur concurrently.

Figure 4:
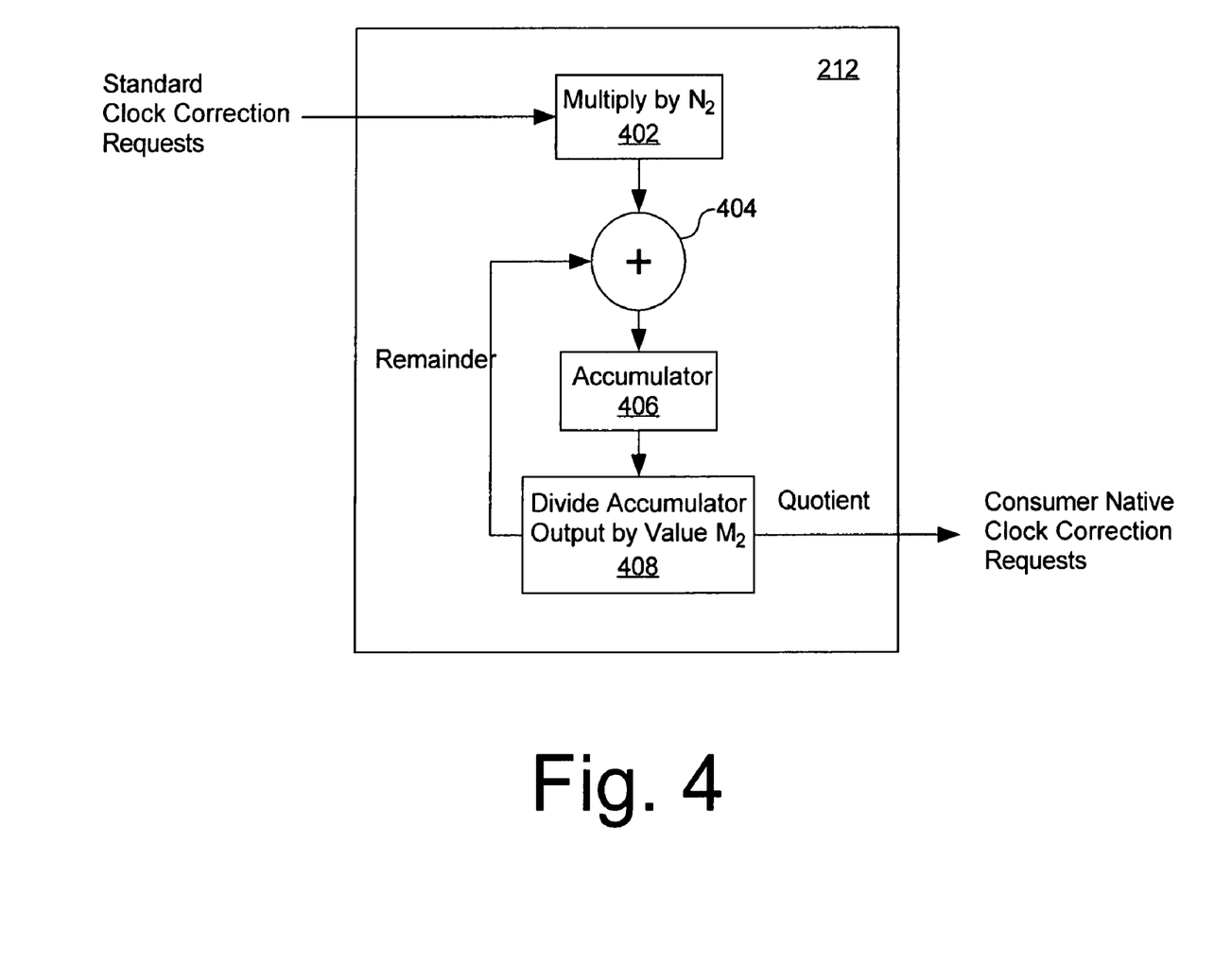
FIG. 4 is a detailed block diagram showing the features of a second clock translation block in FIG. 2.

The standard clock correction request can be received by the clock correction translation block 212 in the downstream functional block 104. The standard clock correction request must be converted to a consumer native clock correction request. As used herein the term consumer native clock correction request refers to clock corrections that are expressed in terms of natural quanta associated with the downstream functional block 104. Natural quanta in this case means a quanta or time increment that is an integer sub-multiple of the consumer-native clock correction request value.

Figure 6:
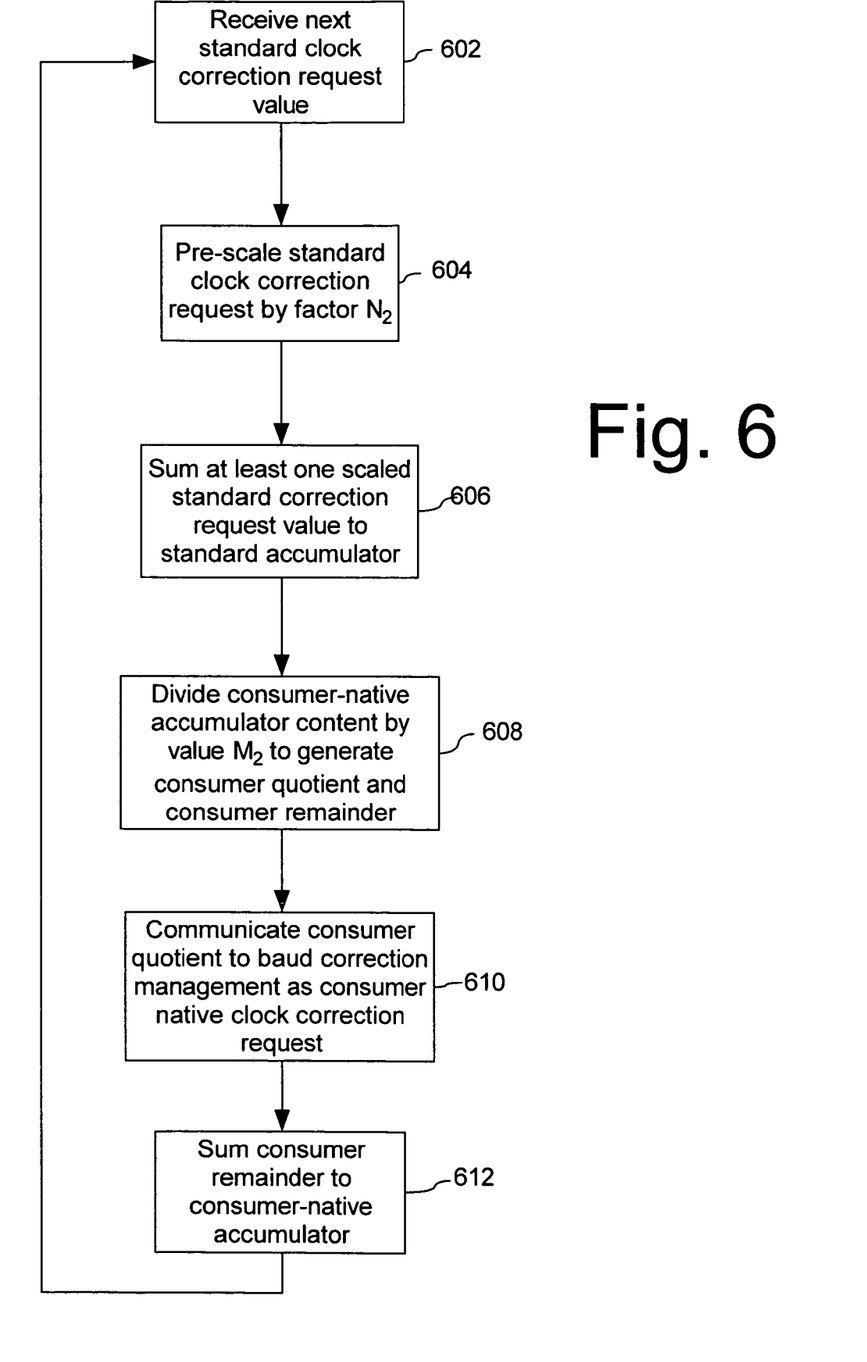
FIG. 6 is a flowchart that is useful for understanding the invention.

The process described in relation to FIGS. 4 and 6 is similar to the process described in relation to FIGS. 3 and 5. In step 602, standard clock correction requests are received by the clock correction translation block 212. Once received, these raw standard clock correction requests are scaled up in step 604 by a multiplication factor of $N_2$ in multiplication block 402. Thereafter in step 606, the scaled standard clock correction requests are summed to the standard accumulator 406. A consumer remainder resulting from a division process in step 608 is also summed to the standard accumulator 406. The consumer remainder is associated with a division performed on a preceding clock correction request as described in further detail below.

The sum of at least one scaled standard correction request and the consumer remainder, if any, is stored in the standard accumulator. The sum defines an adjusted standard clock correction request. The adjusted standard clock correction is subsequently passed to functional block 408 where it is divided by value $M_2$ in step 608. The division by value $M_2$ completes the $N_2/M_2$ rate conversion to generate a consumer-native clock correction value. This consumer-native clock correction value is comprised of a consumer-native quotient and a consumer-native remainder. In step 610, the quotient is communicated to the baud correction management block 214 as a consumer-native clock correction request. The baud correction management block 214 can accumulate clock corrections and apply them to the baud rate generator 216 in accordance with conventional techniques. In step 612, the consumer-native remainder from functional block 408 is summed with the next incoming standard clock correction request, to generate the next adjusted standard clock correction.

Clock corrections can be performed indefinitely with the foregoing approach without concern for generating an accumulation of rounding or truncation errors. That is because the remainders from the division process are always summed back into the next incoming clock correction. Accordingly, rounding or truncation errors cannot accumulate over time.

In light of the foregoing description of the invention, it should be recognized that the present invention can be realized in hardware, software, or a combination of hardware and software. The processes described herein can be realized in a centralized fashion in one or more processing systems or in a distributed fashion where different elements are spread across several interconnected systems. Any kind of computer system, or other apparatus adapted for carrying out the methods described herein, is suited. A typical combination of hardware and software could be one or more general purpose computer processors or digital signal processors with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Additionally, the description above is intended by way of example only and is not intended to limit the present invention in any way, except as set forth in the following claims. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

I claim:

1. Apparatus for communicating clock correction data between a plurality of clocked entities using a clock correction unit, comprising:
   a source-native pre-scaler for converting a plurality of source-native clock correction values to a plurality of scaled source-native clock correction values, said pre-scaler multiplying each source-native clock correction value by a factor $N_1$;
   a source-native divider for dividing an adjusted source-native clock correction value by a value $M_1$ to produce a standard quotient and a standard remainder, said standard quotient defining a standard clock correction value;
   a source-native accumulator for accumulating a sum comprised of at least one of said scaled source-native clock corrections and said standard remainder produced from said source-native divider, said sum defining said adjusted source-native clock correction value; and
   a communication link for communicating each said standard clock correction value from a first clocked entity to a second clocked entity.

2. The apparatus according to claim 1, further comprising a consumer-native pre-scaler for converting a plurality of said standard clock correction values to a plurality of scaled standard clock correction values, said consumer-native pre-scaler multiplying each standard clock correction value by a factor $N_2$.

3. The apparatus according to claim 2, further comprising a consumer-native divider for dividing an adjusted standard clock correction value by a value $M_2$ to produce a consumer quotient and a consumer remainder, said consumer quotient defining a consumer-native clock correction value.

4. The apparatus according to claim 3, further comprising a standard accumulator for accumulating an accumulator sum comprised of at least one of said scaled standard clock correction values and said consumer remainder produced from said consumer-native divider, said accumulator sum defining said adjusted standard clock correction value.

5. The apparatus according to claim 1, wherein each said first and said second clocked entity are selected from the group consisting of a synchronous data terminal, a data communications portion of a synchronous data communication radio, and a modem portion of a synchronous data communication radio.

6. The apparatus according to claim 1, further comprised of a common clock, wherein a local clock rate for said first clocked entity and said second clocked entity are derived from said common clock.

7. The apparatus according to claim 1, further comprising a communication link for communicating each said source-native clock correction value to a timing adjustment system associated with said first clocked entity.

8. A method for communicating clock correction data between a plurality of clocked entities using a clock correction unit, comprising:
   converting a plurality of source-native clock correction values to a plurality of scaled source-native clock correction values by multiplying each source-native clock correction value by a factor $N_1$;
   dividing an adjusted source-native clock correction value by a value $M_1$ to produce a standard quotient and a standard remainder, said standard quotient defining a standard clock correction value;
   accumulating a sum comprised of at least one of said scaled source-native clock corrections and said standard remainder produced from said source-native divider, said sum defining said adjusted source-native clock correction value; and
   communicating each said standard clock correction value from a first clocked entity to a second clocked entity.

9. The method according to claim 8, further comprising converting a plurality of said standard clock correction values to a plurality of scaled standard clock correction values by multiplying each standard clock correction value by a factor $N_2$.

10. The method according to claim 9, further comprising dividing an adjusted standard clock correction value by a value $M_2$ to produce a consumer quotient and a consumer remainder, said consumer quotient defining a consumer-native clock correction value.

11. The method according to claim 10, further comprising accumulating a sum comprised of at least one of said scaled standard clock correction values and said consumer remainder produced from said consumer-native divider, said sum defining said adjusted standard clock correction value.

12. The method according to claim 8, further comprising selecting each said first and said second clocked entity from the group consisting of a synchronous data terminal, a data communications portion of a synchronous data communication radio, and a modem portion of a synchronous data communication radio.

13. The method according to claim 8, further comprising deriving a local clock rate for said first clocked entity and said second clocked entity from a common clock.

14. The method according to claim 8, further comprising communicating each said source-native clock correction value to a timing adjustment system associated with said first clocked entity.

15. A machine readable storage media, having stored thereon a computer program having a plurality of code sections executable by a machine for causing the machine to perform the steps of:

converting a plurality of source-native clock correction values to a plurality of scaled source-native clock correction values by multiplying each source-native clock correction value by a factor $N_1$;

dividing an adjusted source-native clock correction value by a value $M_1$ to produce a standard quotient and a standard remainder, said standard quotient defining a standard clock correction value;

accumulating a sum comprised of at least one of said scaled source-native clock corrections and said standard remainder produced from said source-native divider, said sum defining said adjusted source-native clock correction value; and communicating each said standard clock correction value from a first clocked entity to a second clocked entity.

\* \* \* \* \*